United States Patent [19]

Lee

[11] 3,935,735
[45] Feb. 3, 1976

[54] ULTRASONIC FLOW METER

[75] Inventor: Bock W. Lee, El Cerrito, Calif.

[73] Assignee: Badger Meter, Inc., Richmond, Calif.

[22] Filed: Sept. 3, 1974

[21] Appl. No.: 502,518

[52] U.S. Cl. ............................................. 73/194 A
[51] Int. Cl.² ........................................... G01F 1/66
[58] Field of Search ................................. 73/194 A

[56] References Cited
UNITED STATES PATENTS

| | | | |
|---|---|---|---|
| 3,050,997 | 8/1962 | Lake | 73/194 A |
| 3,473,378 | 10/1969 | Yoshiyama et al. | 73/194 A |
| 3,631,719 | 1/1972 | Charvier | 73/194 A |
| 3,731,532 | 5/1973 | Courty | 73/194 A |
| 3,738,169 | 6/1973 | Courty | 73/194 A |

Primary Examiner—Charles A. Ruehl
Attorney, Agent, or Firm—Lothrop & West

[57] ABSTRACT

Facing each other diagonally across a pipe for flowing fluid is a pair of like, transmitter-receiver units operating with signals of supersonic frequency. The units are in a joint circuit and periodically are simultaneously energized to transmit identical signals to each other in opposite directions in high frequency bursts, each burst being of a chosen number of cycles and being shorter than the transmission time between the units. The bursts, received between successive transmissions, are phase shifted with respect to each other, resulting from one burst being speeded up and the other burst being slowed down in accordance with the velocity of the liquid traversed. The received bursts, in sine wave form, are heterodyned with a cosine wave form modulating signal to produce a sine wave resulting signal dependent upon phase difference between the bursts and at a low frequency. The modulating signal frequency is chosen so as to translate the multiple cycles of each high frequency burst into but one cycle in the resulting signal. The signal is manipulated electronically and its zero-crossings are demarked on a time base to establish the interval between them as a measure of the velocity of the liquid independent of sonic velocity.

22 Claims, 5 Drawing Figures

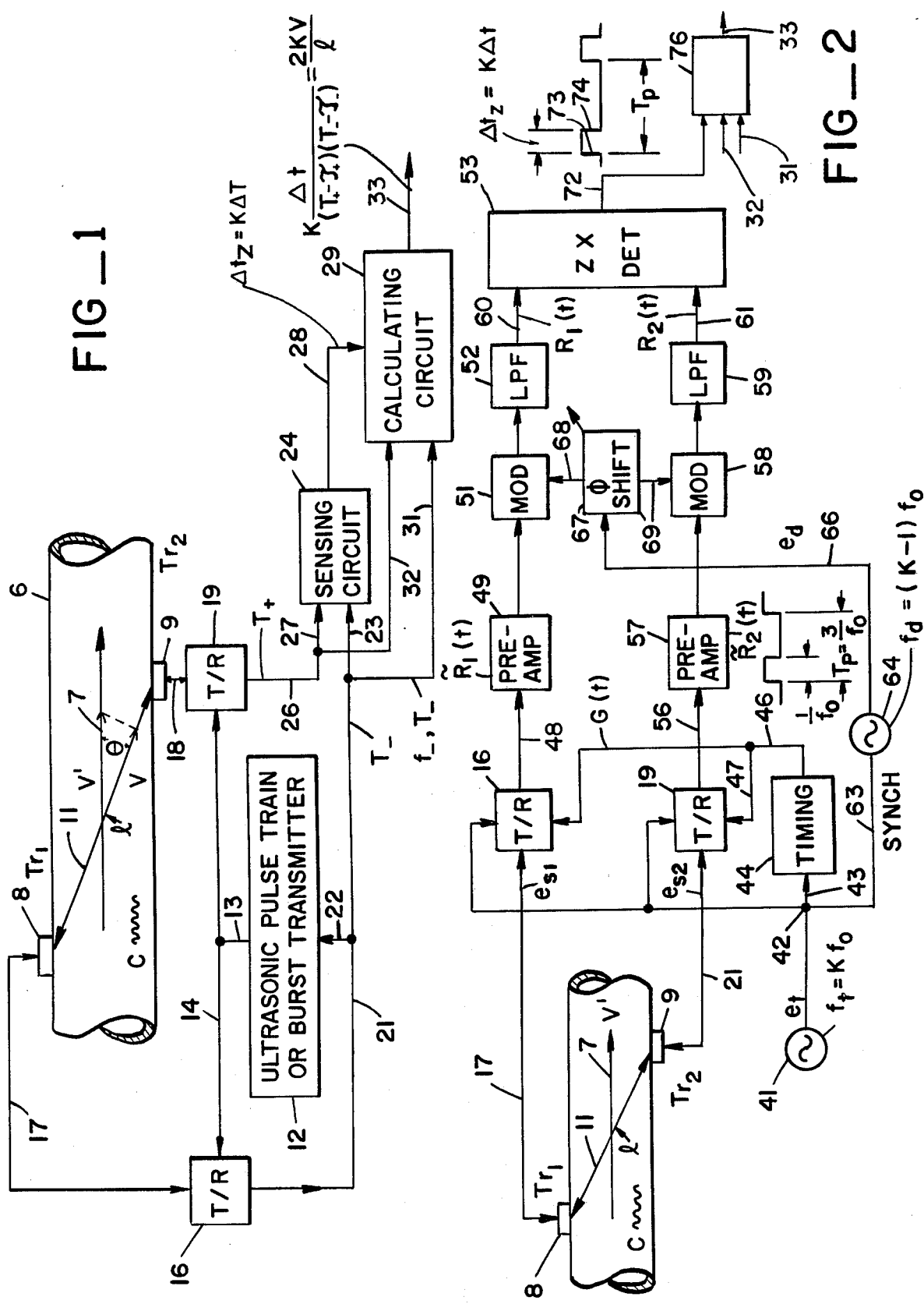

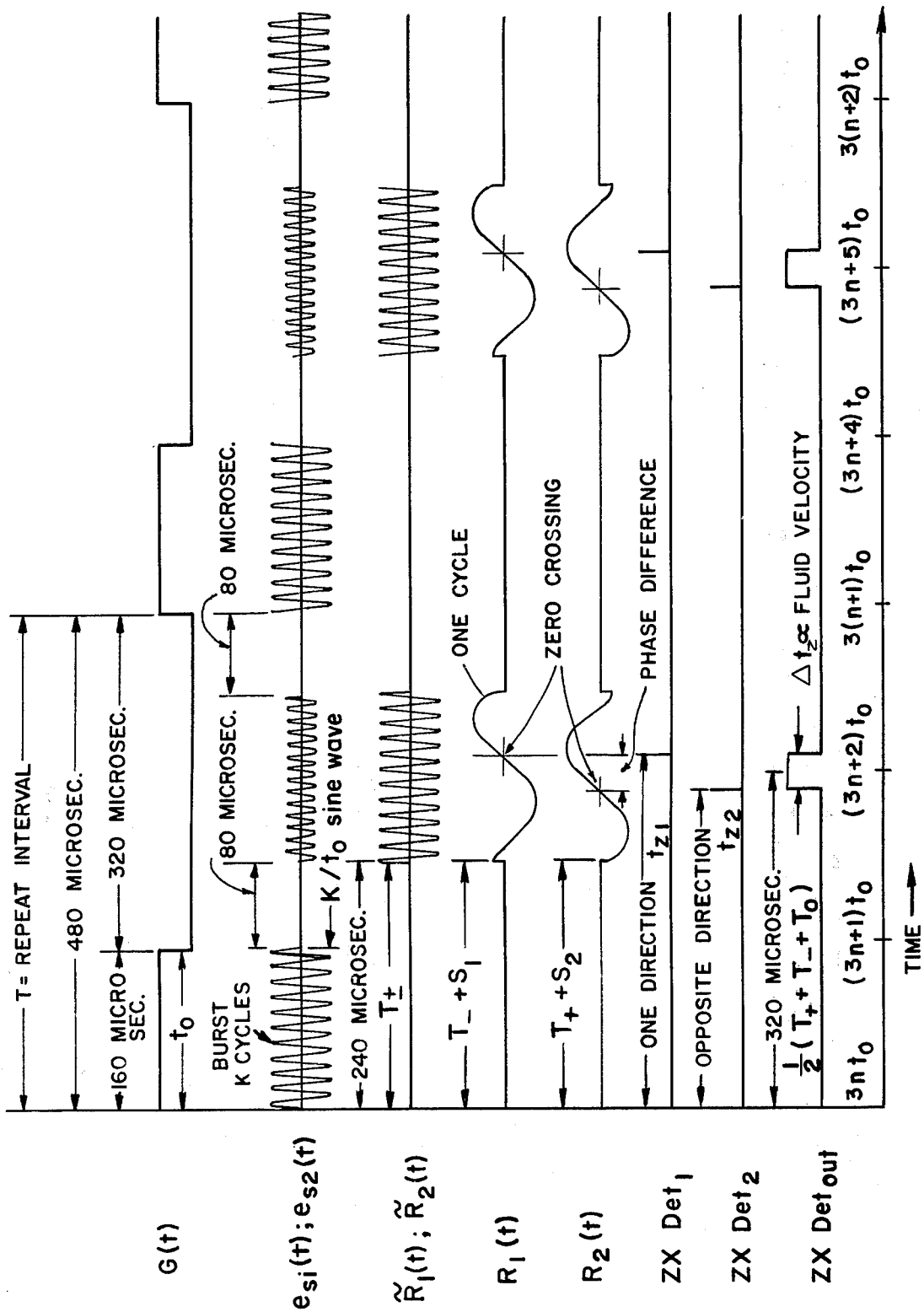
FIG_3

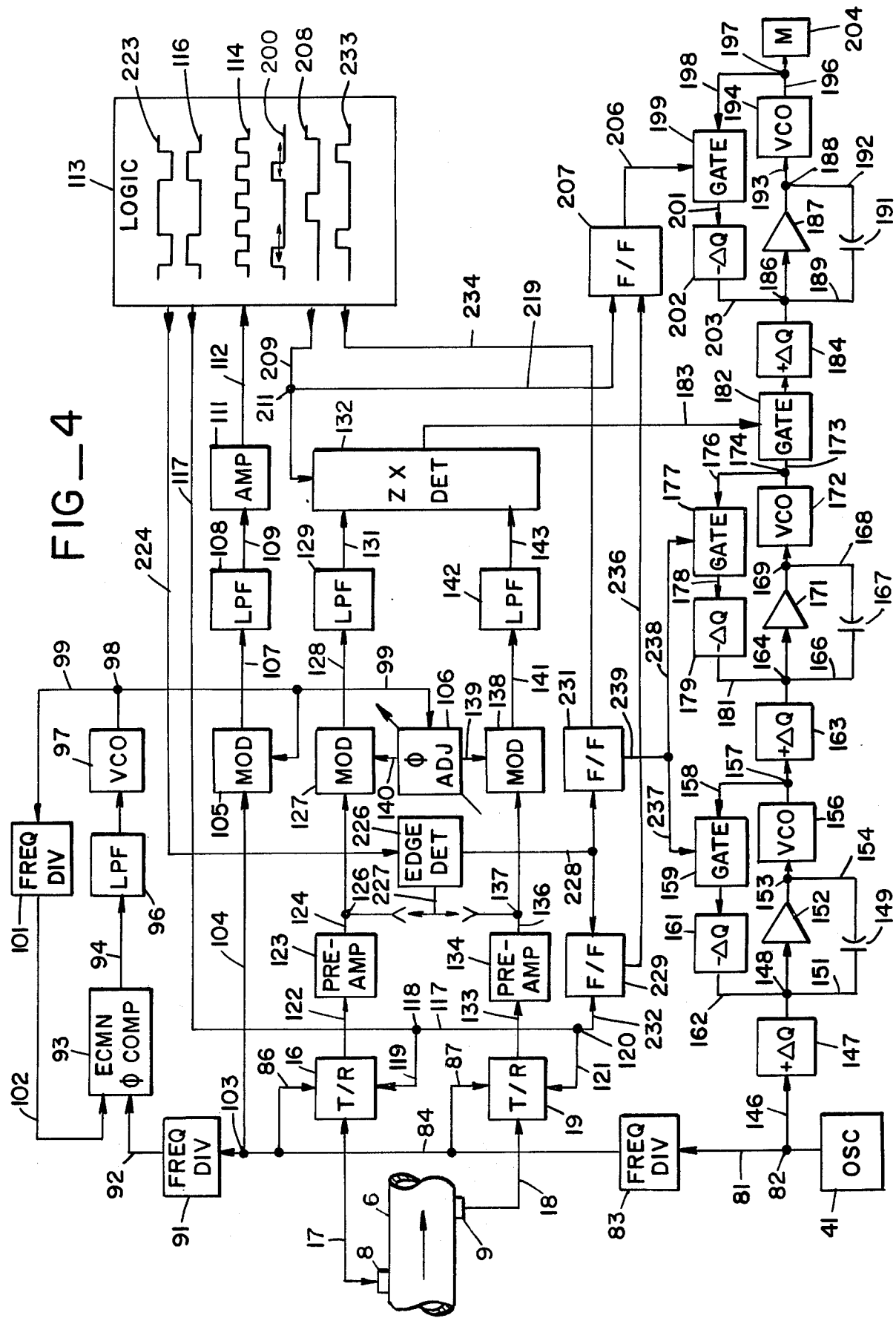
FIG_4

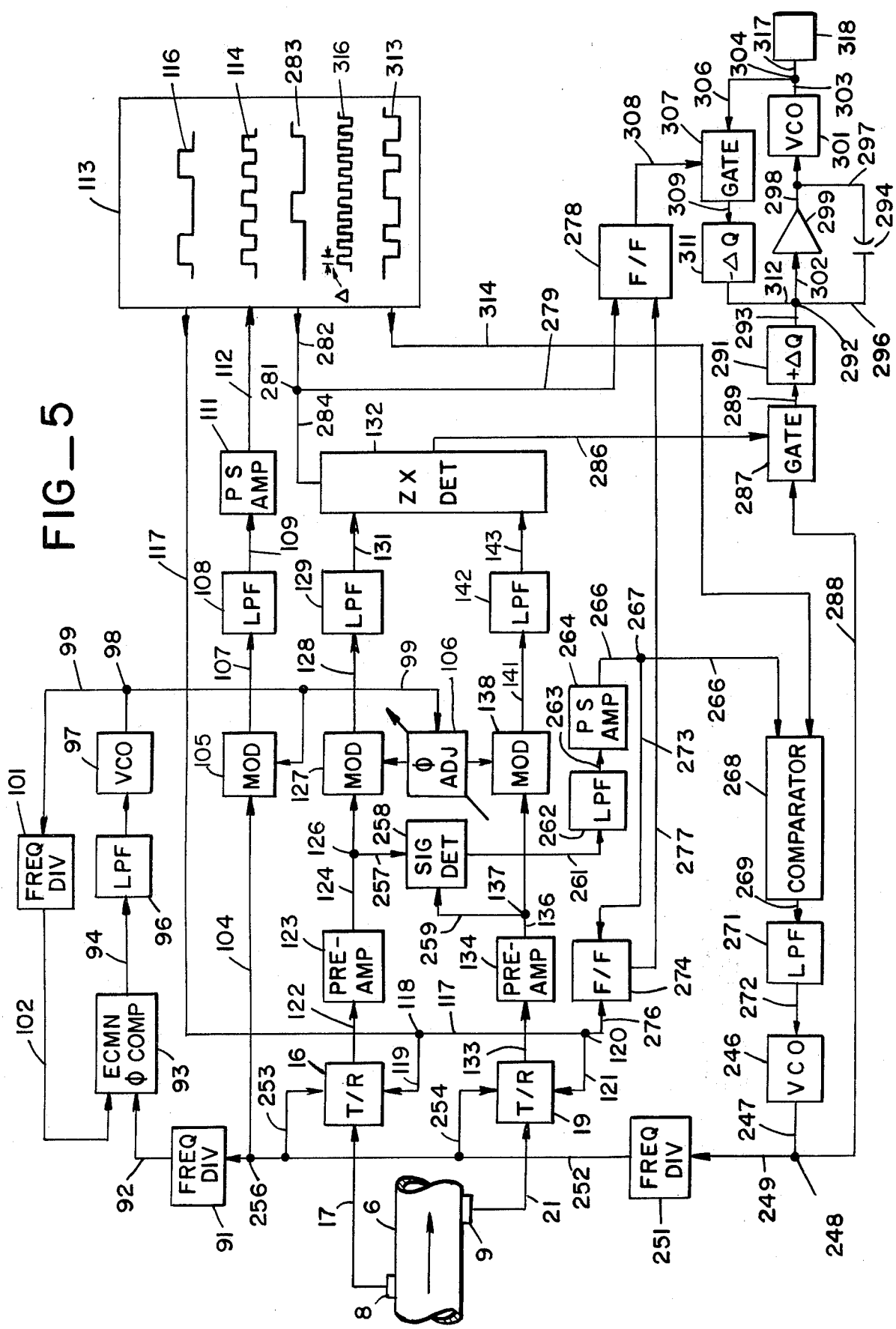
FIG_5

ULTRASONIC FLOW METER

In the measurement of fluids flowing through a pipeline it is desirable to provide an arrangement for detecting the fluid flow, usually liquid flow, in a non-invasive fashion and with considerable accuracy and with mechanism which is relatively inexpensive and long lived. It is also desirable to have a measuring device which will easily afford a plain readout unaffected, within wide tolerances, by variations in temperature and comparable ambient conditions. While ultrasonic flow meters have been provided with more or less success for various installations, particularly in large diameter pipelines, it is still difficult to afford an appropriate instrument for pipelines of relatively small size and with repeatable indications of an accurate nature.

It is therefore an object of the invention to provide an ultrasonic flow meter which can easily be installed in a pipeline of any size, even a moderate size, and which will afford an accurate indication of the flow velocity in the pipe on a consistent and repeatable basis.

Another object of the invention is to provide an ultrasonic flow meter that is simple in operation and can be expected to operate over a protracted period under varying temperature and varying other ambient conditions without difficulty and with undiminished accuracy.

A further object of the invention is in general to provide an improved flow meter.

Other objects together with the foregoing are attained in the embodiment of the invention described in the accompanying description and illustrated in the accompanying drawings, in which:

FIG. 1 is a diagram of a section of a pipe with a diagrammatically illustrated ultrasonic flow meter pursuant to the invention installed in connection therewith;

FIG. 2 is a diagrammatic showing of one form of ultrasonic flow meter pursuant to the invention;

FIG. 3 is a diagram illustrating in graphical form various of the operating characteristics of the ultrasonic flow meter;

FIG. 4 is a block diagram, more extensive than FIG. 2, showing one form of ultrasonic flow meter pursuant to the invention; and FIG. 5 is a block diagram showing another form of ultrasonic flow meter pursuant to the invention.

The present arrangement is for the use of ultrasonic energy in the measurement of the velocity of a fluid flowing in a pipe and independently of the velocity of sound in that fluid. The flow velocity is determined by measuring the difference in transmission time through the flowing fluid of two ultrasonic signals simultaneously propagated as carefully regulated bursts, one burst going in a path having a component in the direction of the fluid flow, and the other identical burst going in a path having a component counter to the direction of fluid flow. The transmission time through the fluid of each burst is represented by a phase shift therein.

Especially in moderate to small-size pipes the time difference between the two oppositely directed signals is very short and is difficult to measure, and changes therein are extremely hard to measure accurately or within a small fraction, say one per cent, of the desired meter scale. The differences in transmission time are measured as a phase shift at an ultrasonic carrier frequency $f_t$ which is translated to a like phase shift at a low frequency $f_o$. This is accomplished by heterodyning a modulating signal of frequency $f_d$ with the carrier frequency $f_t$, the three frequencies being related as $f_t = Kf_o$ and $f_d = (K-1)f_o$, wherein $K$ is a large integer, so that during heterodyning the difference frequency $f_t-f_d = f_o$. A phase shift at the carrier frequency $f_t$ induces exactly the same phase shift at the difference frequency $f_o$. In effect, the difference in transmission time through the fluid is multiplied by the ratio ($K$) of the carrier frequency $f_t$ to the difference frequency $f_o$. For example, a one microsecond difference in transmission time in the fluid when the factor ($K$) is 50 yields an apparent difference in transmission time of fifty microseconds at the difference frequency.

The carrier is in the form of sine waves, and the heterodyning signal is in the form of cosine waves, so the resultant signal is in the form of sine waves, making zero-crossing detection convenient. The carrier frequency signal is accurately phased with respect to the heterodyning frequency. The phase shift is made adjustable so that errors in phase shift caused by various circuit time delays may be corrected.

The carrier frequency signal is transmitted for exactly $K$ cycles for each burst of transmission. This allows exactly one cycle of the difference frequency to be extracted. The time required for the burst to pass through the fluid must be at least $K$ cycles and preferably is about one and one-half $K$ cycles so that the transmit and receive portions of the signals are clearly separated.

While the ultrasonic flow meter as briefly outlined above and pursuant to the present invention can be installed in many different environments and in pipes of various different sizes and for use with various fluids, particularly liquids, it is especially adapted for installation in pipes of relatively modest size; for example, of a few inches in diameter, and in which the velocity of fluid flow over a wide range is to be determined.

In an exemplary instance, primarily to establish generalities, the installation is made in a pipe 6 (FIG. 1) carrying fluid, liquid, for example, travelling in the direction of the arrow 7 at a velocity to be determined. Secured on or in the wall of the pipe 6 are transmitting and receiving devices 8 and 9 or transducers. These are customarily installed facing each other on opposite sides of the pipe and are spaced apart in the direction of fluid flow, so that the path 11 between the devices 8 and 9 is diagonal or inclined, its direction partaking of a component diametrically across the pipeline and of a component axially along the pipeline and its length being determinable.

Installations of this physical character are already known, but there is often a difficulty, particularly in the smaller diameter pipelines, in that the path 11 is so short that the difference between signals travelling such path in opposite directions, and traversing the distance in an extremely short time, is difficult or impossible to measure accurately, especially when influenced by small changes in fluid flow velocity.

In the present general case there is provided an ultrasonic or high frequency pulse train or burst transmitter 12. This includes structure for furnishing at intervals a number of relatively short pulses or cycles in a sequence of a predetermined length, each one of the sequences being considered as a train or as a burst. Each burst is controlled as to time of start and as to duration and so time of stop. The pulse train or burst transmitter 12 is provided with a lead 13 joined to a common conductor 14 sending the pulse train simultaneously in two directions. In one direction the pulse train arrives at a transmit-receive unit 16 (T/R) having the ability to transmit the pulse train and also to receive a similar pulse train. The pulse train from the transmit-receive unit 16 travels through a conductor 17 to the transducer device 8 ($Tr_1$) and from there travels across the pipe along the path 11 in one direction to the other transducer device 9 ($Tr_2$), from which the signal is carried through a lead 18 to another transmit-receive unit 19 (T/R) connected at the other end of the conductor 14.

When the pulse train transmitter 12 emits a pulse train to the conductor 14, the burst not only goes to the transmit-receive unit 16, as described, but simultaneously is impressed upon the transmit-receive unit 19 and so goes through the lead 18 to the transducer 9 and from there travels in the path 11 in a direction opposite to the direction of travel of the pulse train from the transducer 8. This oppositely directed burst is received by the transducer 8 and travels through the conductor 17 to the transmit-receive unit 16. In this way, a pulse train or burst from the transmitter 12 is in effect divided, is made simultaneously effective upon the transmit-receive units 16 and 19, and the split pulse trains or bursts travel simultaneously in opposite directions along the path 11 and are respectively received at the opposite one of the transmit-receive units 16 and 19.

A pulse train or burst received at the transmit-receive unit 16 is carried through a conductor 21 having a connection 22 to the transmitter 12 and also extending through a lead 23 to a sensing circuit element 24. In a similar fashion, a signal or burst received at the other transmit-receive unit 19 is carried through a conductor 26 joined by a lead 27 to the sensing circuit element 24. In the sensing circuit element 24 the two bursts there received are lowered in frequency, compared as to phase, and in effect one is subtracted from or algebraically added to the other, as will later appear, and the difference between or net difference in the two bursts due to traversing the pipe is carried through a conductor 28 to a calculating circuit unit 29.

The received signal from the first transmit-receive unit 16 supplied to the sensing circuit element 24 is also made available through a branch conduit 31 to the calculating circuit unit 29. Likewise, the signal from the transmit-receive unit 19 is carried through the conductor 26 and through a lead 32 extending therefrom to the calculating circuit unit 29. In the calculating circuit unit the various received signals are compared and manipulated to emerge through a conductor 33 to any suitable display device (not shown) as a signal or reading indicative of the velocity of the fluid flowing in the direction of the arrow 7 in the pipe 6.

In the foregoing arrangement, while both the transmit-receive units 16 and 19 transmit simultaneously and also receive simultaneously, the timing is arranged so that the duration of the train of pulses or bursts being sent simultaneously from the devices 8 and 9 extends for a predetermined interval of time (usually less than the time to traverse the pipe), followed by a non-signal or silent interval, and following that both of the transmitting and receiving devices 8 and 9 transmit the signals as received to the transmit-receive units 16 and 19. That is, there is a simultaneous transmission of two trains of pulses or two bursts in opposite directions along the path 11, there is then an interval of no signal, and finally there is a simultaneous receive period for the signals which have just been sent. The duration for traverse of the path 11 allows the non-signal intervals. The transmit time and the receive time are not intermixed or overlapped and are maintained quite distinct from each other.

The generalized arrangement is developed in more detail, as particularly shown in FIG. 2. There is provided an oscillator 41, preferably a crystal controlled oscillator, having a substantially set frequency $f_t$ for generating the individual cycles or pulses to make up the various pulse bursts and effective to provide a signal at a junction 42 joined to the two transmit-receive units 16 and 19. From the junction 42 there is a lead 43 extending to a timing circuit 44 itself having a lead 46 (with a branch 47) extending to and controlling the burst timing at the transmit-receive units 16 and 19. This arrangement is set up so that each of the pulse bursts or cycle trains has a particular or set number of unit pulses in it.

As in FIG. 1, signals are transmitted to and received from the transducers 8 and 9 over conductors 17 and 21 for travel along the path 11. The respective signal bursts, having traversed the path 11 in opposite directions, are appropriately compared. This is done by taking a high frequency, received burst signal from the transmit-receive unit 16, for example, through a lead 48, sending it through a preamplifier 49 and into a heterodyning modulator 51. Therein the incoming high frequency signal is heterodyned with a synchronized reference signal to produce a low frequency sine wave resulting for each burst, the ratio of high input signal frequencies to low output signal frequencies being K. The modulator output is led through a low-pass filter 52 to retain only the desired part of the resulting signal, which is introduced in the form of a single sine wave into a zero-crossing detector 53. Comparably, the other received burst from the transmit-receive unit 19 is dispatched through a lead 56 and through a preamplifier 57 into a heterodyning modulator 58 duplicating the modulator 51 and from which the resulting sine wave signal travels through a low-pass filter 59 to exclude unwanted factors and then as a single sine wave travels through a lead 61 into the zero-crossing detector 53.

It is important that during the above-noted modulation the signal phase be carefully controlled to compensate for errors due to various time delays that occur in various parts of the apparatus. A conductor 63 from the junction 42 connects the source of the synchronized reference signal, an oscillator 64, through a conductor 66 to a phase adjustment device 67. The oscillator 64 generates a synchronized, cosine form wave, so that when heterodyned with the sine wave from the oscillator 41 a sine wave results to facilitate zero-crossing detection. The phase corrected signal from the conductor 66 is made effective through a lead 68 upon the signal modulator 51 and similarly is carried through a lead 69 to the modulator 58. The signals from both the modulators 51 and 58 are passed through low-pass filters 52 and 59 (LPF) to remove unwanted components and are transmitted in step through conductors 60 and 61 to the zero-crossing detector 53.

In that detector, the signal from the transmit-receive unit 16 is effective when it crosses zero to provide an output through a lead 72 going to a calculating unit 76 also having inputs 31 and 32 and an output 33. As illustrated in FIG. 2, the output is in effect one edge 73 of a square wave on a time base and having a standard or fixed amplitude. The signal from the transmit-receive unit 19 in its turn actuates the zero-crossing detector 53 at an instant depending on its difference in phase from the first signal and represents the other boundary 74 or edge of the constant amplitude square wave. There is thus provided a square wave output through the lead 72. The length or horizontal dimension of the square wave is equal to the product of the ratio K and the difference in transit times, which is directly indicative of and is proportional to the velocity of the stream flowing in the direction of the arrow 7 in the pipe 6. In the event there is substantially no flow in the pipe 6, then the two signals from the transmit-receive units 16 and 19 cross zero at the same instant within the zero-crossing detector 53 and so afford a square wave of a vanishing horizontal dimension or of no width, showing that there is no flow.

The zero flow situation can readily be utilized for calibration. Under conditions of no flow, there should be no indication on the meter. If there is an indication, an adjustment of the phase relationship of the two pulse bursts is needed. The phase shift unit 67 is then manually adjusted under a condition of no flow to shift the phase of one or the other, or both, of the pulse train signals at the modulators 51 and 58 so that there is no phase difference. Consequently, the zero-crossings of both signals occur simultaneously in the unit 53, and the observable width of the signal correctly becomes zero.

Prefacing a mathematical analysis of the system, the arrangement is recapitulated as it is embodied for a pipe 6 in which a fluid is flowing in the direction of an arrow 7 and at a velocity $v'$. On opposite sides of the pipe and spaced apart a distance $l$ having an axial component, i.e. in the direction of fluid flow, is a transducer 8 ($Tr_1$) and a transducer 9 ($Tr_2$). Short duration bursts of ultrasonic pulses travel simultaneously between the transducers along the path 11. These bursts are generated in a transmitter 12 having a connection through leads 13 and 14 to a transmitter-receiver 16 joined to the transducer 8 by a conductor 17, and to a transmitter-receiver 19 joined to the transducer 9 by a conductor 18.

Received pulse bursts from the transducer 8 are carried by a conductor 21 joined by a lead 22 to the transmitter 12 and are carried by the conductor 21 and by a lead 23 to a sensing circuit 24 also receiving pulse bursts from the transducer 9 through a conductor 26 and a lead 27. The output of the sensing circuit 24 is taken by a conductor 28 to a calculating circuit 29, which also receives the respective received pulse bursts from a conductor 31 associated with the transducer 8 and from a conductor 32 associated with the transducer 9. The calculating circuit output travels through a conductor 33 to a display, not shown.

For the burst of pulses going in the direction from $Tr_1$ to $Tr_2$ the velocity of propagation is higher than in the other direction from $Tr_2$ to $Tr_1$ due to the directional velocity of fluid flow. Consequently, the transducer $Tr_2$ will receive its concurrently emitted burst of ultrasonic pulses before the transducer $Tr_1$ receives its corresponding burst. The component of the flow velocity along path 1 is $v$, the axial distance apart of the transducers is $l$, and denoting the velocity of sound in the fluid as $c$, the elapsed times from the simultaneous beginning of the transmitted pulses to their respective receptions at the "receive" terminals of the transmit-receive devices 19 and 16 are respectively denoted as $T_+$ and $T_-$. These are expressible as $$T_+ = t_+ + \tau_+ \quad (1)$$

and $$T_- = t_- + \tau_- \quad (2)$$

where $$t_+ = \frac{\beta}{(c+v)} \quad (3)$$

and $$t_- = \frac{\beta}{(c-v)} \quad (4)$$

are the transit times through the fluid in the two directions, and $\tau_+$ and $\tau_-$ are the total system time delays (other than the transit time through the fluid medium); i.e. the sums of the delays in the electronic apparatus, cabling, transducers and pipe walls in the respective opposite directions.

The delays $\tau_+$ and $\tau_-$ can be assumed to be equal and, if so, can be represented by $\tau$, but the assumption is nearly true but not entirely so. But if the assumption is accepted, then $$\Delta\tau = \tau_- - \tau_+ = 0 \quad (5)$$

and it follows that $T_- > T_+$ and the ultrasonic loop of FIG. 1 will "sing around" at the frequency $$f_- = \frac{1}{T_-}. \quad (6)$$

The same assumption yields, by reason of equation (5), $$\Delta t = T_- - T_+ = t_- - t_+ = \frac{2lv}{(c^2-v^2)} \quad (7)$$

which is independent of $\tau$.

The present method of obtaining a fluid flow measure independent of sound velocity results from the relationship $$t_+ t_- = \frac{l^2}{(c^2-v^2)} \quad (8)$$

which combines with equation (7) to yield $$\frac{2v}{l} = \frac{\Delta t}{t_+ t_-} \quad (9)$$

From equation (9) it is clear that a determination of the flow velocity $v$ can be made from measurements of $\Delta t$, $t_+$ and $t_-$. For all cases of flow velocity measurement within a wide range, it may be assumed that $v \lll c$ ($v$ is much smaller than $c$), so that the equation (9) can be reduced to $$\frac{2v}{l} \approx \frac{\Delta t}{t_\pm^2} \quad (10)$$

wherein $t$ denotes either $t_+$ or $t_-$.

In terms of directly measured quantities $$t_\pm = T_\pm - \tau \quad (11)$$

and consequently $$\frac{2v}{l} \approx \frac{\Delta t}{(T_\pm - \tau)^2} \tag{12}$$

While the foregoing outline is correct, it is difficult to implement practically because in any customary case the value $\Delta t$ is very small. For a pipe in which $l$ is 1 foot and in a medium which has $c$ as 5000 ft/sec, a full-scale flow of 2.5 ft/sec gives a value for $\Delta t$, according to equation (7), of only 0.2 $\mu$ sec ($0.2 \times 10^{-6}$ sec). For an accuracy of 1 percent of full scale, $\Delta t$ must be determined within less than 2 nsec ($2 \times 10^{-9}$ sec). The fastest present digital circuits have time delays of about 1 nsec, and the fastest present linear circuitry and companion detectors have time delays in the 10 to 30 nsec range. Also, this method depends upon the propagation and detection of short pulses through the flow medium, which tends to "smear" these pulses in the time domain and makes virtually impossible the precise determination of reception times.

While some other partial improvements might be made, a great improvement can be made by more careful signal processing and especially by an effectively longer exposure of the ultrasonic signals to the flow medium in a way to magnify the quantity $\Delta t$. For example, an effective magnification of $\Delta t$ by 50 would then require a resolution of only 100 nsec, well within the limits of available electronic circuits.

A further improvement can be made by exciting the transducers with bursts of sinusoidal waves of a specific, common frequency and detecting such bursts through demodulation techniques and zero-crossing identification. This reduces the effect of fades due to local variation in solids and air bubbles in the fluid or liquid.

As particularly shown in FIG. 2, the pipe set-up is as before, but an electronic generator 41 is used to generate a continuous sinusoidal wave form of a specific frequency $$f_t = Kf_o, f_o = \frac{1}{t_o} \tag{13}$$

wherein $K$ is a large specific integer corresponding to the number of cycles of sinusoidal waves in each burst and $t_o$ is the time or duration of each burst. The output of the generator 41 is given by $$e_t(t) = E_t \mathrm{Sin}(2\pi K f_o t) \tag{14}$$

This output appears at a junction 42 having leads to the transmitter-receivers 16 and 19 and is effective through a lead 43 and a timing device 44 and from there through conductors 46 and 47 to control the operation of the T/R switches 16 and 19 connected to the transducers 8 and 9. From the junction 42 a conductor 63 also carries a synchronization input to a second generator effective to generate a cosinusoidal wave form of frequency $$f_d = (K-1)f_o \tag{15}$$

The output of the second generator is $$e_d(t) = E_d \mathrm{Cos}(2\pi(K-1)f_o t) \tag{16}$$

and is used as a synchronized reference signal for demodulating the received ultrasonic signals. The timing device 44 is synchronized with the phase and frequency denoted by equation (14). The output of this timer 44 is a periodic series of gates, each of time or duration $t_o$ and with a repetition period $$T_p = 3t_o \tag{17}$$

Hence the output of the timing circuit 44 is a gate signal expressed by $$G(t) = \sum_{n=0}^{\alpha} G_o(t - nT_p) \tag{18}$$

wherein $$G_o(x) = \begin{cases} 1, & o < x < t_o \\ o, & \text{otherwise.} \end{cases} \tag{19}$$

Since the gate signals specified in equations (18) and (19) control the T/R switches 16 and 19, the transducer ports of these switches are connected in each period $T_p$ first to the output of the sinusoidal generator for a time duration $t_o$ and then to the receiving preamplifiers 49 and 57 for the remaining time duration $2t_o$. Hence the excitations applied to the conductors connecting the transducers $Tr_1$ and $Tr_2$ (16 and 19) are respectively $$e_1(t) = E_t G(t-\tau_{11})\mathrm{Sin}(2\pi K f_o(t-\tau_{11})) \tag{20}$$

and $$e_2(t) = E_t G(t-\tau_{21})\mathrm{Sin}(2\pi K f_o(t-\tau_{21})) \tag{21}$$

where $\tau_{11}$ and $\tau_{21}$ are the time delays through the transmit branches of the T/R switches. From these excitations, the transducers $Tr_1$ and $Tr_2$ (8 and 9) produce, at their pipe interfaces, respectively, ultrasonic waves $$U_1(t) = u_1 E_t G(t-\tau_{11}-\tau_{12}-\tau_{13})\mathrm{Sin}(2\pi\lambda K f_o(t-\tau_{11}-\tau_{12}-\tau_{13})) \tag{22}$$

and $$U_2(t) = u_2 E_t G(t-\tau_{21}-\tau_{22}-\tau_{23})\mathrm{Sin}(2\pi\lambda K f_o(t-\tau_{21}-\tau_{22}-\tau_{23})) \tag{23}$$

where $u_1$ and $u_2$ are transduction constants, $\tau_{12}$ and $\tau_{22}$ are delays through the connection cables, and $\tau_{13}$ and $\tau_{23}$ are delays through the transducers.

As the ultrasonic waves propagate through the pipe walls and the flowing fluid to their respective opposite sides, the waves accumulate more time delays and suffer dispersive attenuation along the way. Arriving at the transducers $Tr_1$ and $Tr_2$ the respective ultrasonic waves are given by $$\tilde{U}_1(t) = Du_2 E_t G(t-\tau_{21}-t_2-\tau_w-t_-)\mathrm{Sin}(2\pi\lambda K f_o(t-\tau_{21}-t_2-\tau_w-t_-)) \tag{24}$$

and $$\tilde{U}_2(t) = Du_1 E_t G(t-\tau_{11}-t_1-\tau_w-t_+)\mathrm{Sin}(2\pi K f_o(t-\tau_{11}-t_1-\tau_w-t_+)) \tag{25}$$

where $$t_2 = \tau_{22} + \tau_{23} + \tau_w \tag{26}$$

and $$t_1 = \tau_{12} + \tau_{13} + \tau_w \tag{27}$$

$\tau_w$ is the delay through the pipe wall, $D$ is the dispersive attenuation factor, and $t_+$ and $t_-$ are the transit times through the flowing fluid as given in equations (3) and (4).

The received signals at the transducer ports of the T/R switches arising from equations (24) and (25) are $$r_1(t) = E_r G(t-T_- + \tau_{14})\mathrm{Sin}(2\pi K f_o(t-T_- + \tau_{14})) \tag{28}$$

and $r_2(t) = E_r G(t-T_+ + \tau_{24})\mathrm{Sin}(2\pi k f_o(t-T_+ +\tau_{24}))$ (29)

where $$E_r = Du_1 u_2 E_t \tag{30}$$
$$T_- = t_- + \tau_{21} + \tau_{14} + t_1 + t_2 \tag{31}$$
$$T_+ = t_+ + \tau_{11} + \tau_{24} + t_1 + t_2 \tag{32}$$

and $\tau_{14}$ and $\tau_{24}$ are the total delays through the receive branches of the T/R switches and the receive preamplifiers. The quantities $T_+$ and $T_-$ are the total transit times in the two directions from the transmitter to the outputs of the preamplifiers. Comparing equations (31) and (32) with equations (2) and (1) we have $$T_- = t_1 + t_2 + \tau_{21} + \tau_{14} \tag{33}$$

and $$T_+ = t_1 + t_2 + \tau_{11} + \tau_{24} \tag{34}$$

which show that $$\Delta\tau = T_- - T_+ = (\tau_{21} - \tau_{11}) + (\tau_{14} - \tau_{24}) \tag{35}$$

agrees with the assumption set forth in equation (5) only if $$(\tau_{11} + \tau_{24}) = (\tau_{21} + \tau_{14}).$$

The transducer ports of the T/R switches are shared by the excitations of equations (20) and (21) and the received signals of equations (28) and (29), the total signals at these ports are the superpositions of equations (20) and (28) and equations (21) and (29), $$e_{s1}(t) = e_1(t) + r_1(t) \quad (36)$$

and $$e_{s2}(2) = e_2(t) + r_2(t) \quad (37)$$

In order for the T/R switches to function successfully in isolating the transmitter and the receiving preamplifiers, it is necessary to arrange for the two parts of in which $$\pm \frac{\Delta\phi}{2}$$

are the phase shifts introduced by the phase shifter. Combining equations (47) and (48) with equations (45) and (46) through the actions of the modulators gives the outputs of the modulators as signals $$\hat{R}_1(t) = \frac{a_1}{2} E_r G(t-T_-) \left\{ \sin\left(2\pi f_o t - 2\pi f_o K T_- - \frac{\Delta\phi}{2}\right) + \sin\left(2\pi(2K-1)f_o t - 2\pi f_o t - 2\pi f_o K T_- + \frac{\Delta\phi}{2}\right) \right\} \quad (49)$$

and $$\hat{R}_2(t) = \frac{a_2}{2} E_r G(t-T_+) \left\{ \sin\left(2\pi f_o t - 2\pi f_o K T_+ + \frac{\Delta\phi}{2}\right) + \sin\left(2\pi(2K-1)f_o t - 2\pi f_o t - 2\pi f_o K T_+ - \frac{\Delta\phi}{2}\right) \right\} \quad (50)$$

equations (36) and (37) to be disjoint in time. From equations (20) and (21), excitations $e_1(t)$ and $e_2(t)$, respectively, are non-zero only when $$nT_p + \tau_{11} < t < nT_p + \tau_{11} + t_o \quad (38)$$

and $$nT_p + \tau_{21} < t < nT_p + \tau_{21} + t_o \quad (39)$$

whereas from equations (28) and (29) the received signals $r_1(t)$ and $r_2(t)$, respectively, are non-zero only when $$nT_p + T_- - \tau_{14} < t < nT_p + T_- - \tau_{14} + t_o \quad (40)$$

and $$nT_p + T_+ - \tau_{24} < t < nT_p + T_+ - \tau_{24} + t_o \quad (41)$$

Therefore the required disjointness in the time domain will follow if the conditions $$T_- > \tau_{14} + \tau_{11} + t_o \quad (42)$$

and $$T_+ > \tau_{24} + \tau_{21} + t_o \quad (43)$$

are satisfied by arranging $$T_{av} = \frac{1}{2}(T_- + T_+) \approx \frac{3t_o}{2} \quad (44)$$

It is therefore assumed that the requirement of equation (44) is satisfied and then the T/R switches will separate the received signals from the excitations at their transducer ports and feed those signals to the preamplifiers.

The received signals emerging from the preamplifier outputs are $$\bar{R}_1(t) = a_1 E_r G(t-T_-) \sin(2\pi K f_o(t-T_-)) \quad (45)$$

and $$\bar{R}_2(t) = a_2 E_r G(t-T_+) \sin(2\pi K f_o(t-T_+)) \quad (46)$$

where $a_1 \approx a_2$ represent the gain factors of the amplifiers. Signals $\bar{R}_1(t)$ and $\bar{R}_2(t)$ are applied to their respective one of two modulators 51 and 58. Also applied to these modulators is the consinusoidal wave from the second generator 64 after passing through an adjustable phase shifter 67. The cosinusoidal waves $e_{d1}(t)$ and $e_{d2}(t)$ applied respectively to the $\bar{R}_1(t)$ and $\bar{R}_2(t)$ modulators are given by $$e_{d1}(t) = \cos\left(2\pi(K-1)f_o t + \frac{\Delta\phi}{2}\right) \quad (47)$$

and $$e_{d2}(t) = \cos\left(2\pi(K-1)f_o t - \frac{\Delta\phi}{2}\right) \quad (48)$$

The first terms in equations (49) and (50) are the desired products. By appropriately selecting the cut-off frequency of the low-pass filters (LPF) 52 and 59 following the modulators, the unwanted second terms may be blocked from passing through the filters. Then, the signals emerging from the filters 52 and 59 to the zero-crossing detectors (ZX DET) 53 are as given by $$R_1(t) = \frac{a_1}{2} E_r G(t-T_- -S_1) \sin\left(2\pi f_o(t-KT_- -S_1) - \frac{\Delta\phi}{2}\right) \quad (51)$$

and $$R_2(t) = \frac{a_2}{2} E_r G(t-T_+ -S_2) \sin\left(2\pi f_o(t-KT_+ -S_2) + \frac{\Delta\phi}{2}\right) \quad (52)$$

where $S_1$ and $S_2$ are the relatively small time delays through the filters 52 and 59.

Each of the signals $R_1(t)$ and $R_2(t)$ is composed of two factors. The first is the periodic aperture function $G(\cdot)$ as defined in equation (18) and the second is a sine wave of frequency $f_o = (1/t_o)$. Since the duration of the apertures defined by the function $G(\cdot)$ is also $t_o$, the signals $R_1(t)$ and $R_2(t)$ are each a series of single cycle sine waves of frequency $f_o$ and spacing $T_p = 3t_o$. The main difference between the two signals and hence the information carrier is the relative phases of the single cycle sine waves in each of the signals. These properties are illustrated in FIG. 3.

The time aperture of each signal is defined by its $G(\cdot)$ function taking on non-zero values during each operation cycle. From equation (51), the beginning and end as well as the duration of the aperture for the signal $R_1(t)$ in the $n^{th}$ operation cycle is defined by the inequality $$nT_p + T_- + S_1 < t < nT_p + T_- + S_1 + t_o \quad (52)$$

Similarly, the aperture for the signals $R_2(t)$ in the $n^{th}$ cycle is defined by $$nT_p + T_+ + S_2 < t < nT_p + T_+ + S_2 + t_o \quad (54)$$

The beginning of each operation cycle is defined by the beginning of the excitation burst in the transmitter at periodic times $t = nT_p$, so that the elapsed times from the beginning of the $n^{th}$ operation cycle to the beginnings of the apertures for signals $R_1(t)$ and $R_2(t)$ are respectively $$\Delta T_1 = T_- + S_1 \quad (55)$$

and
$$\Delta T_2 = T_+ + S_2 \qquad (56)$$

The durations of the transmitted bursts are equal to the duration of the apertures of the signals $R_1(t)$ and $R_2(t)$, and the elapsed times from the center of the excitation bursts to the centers of the received signals apertures are also specified by equations (55) and (56). To the extent that $S_1$ and $S_2$ are small time delays, the elapsed times are measures of the transmit times $T_-$ and $T_+$. Equations (32), (32), (33) and (34) may be used to restate the elapsed times of equations (55) and (56) as follows $$\Delta T_1 = t_- + \tau_-' \qquad (57)$$

and $$\Delta T_2 = t_+ + \tau_+' \qquad (58)$$

where $$\tau_-' = \tau_- + S_1 \qquad (59)$$

and $$\tau_+' = \tau_+ + S_2 \qquad (60)$$

Within each of the time apertures defined in equations (53) or (54), the signal $R_1(t)$ or $R_2(t)$ exhibits the sinusoidal characteristics of its second factor and becomes zero whenever the sinusoidal factor becomes zero. For the signal $R_1(t)$ the zero value and therefore the zero crossing occurs in its aperture for the $n^{th}$ operational cycle at time $t_{z1}$ given by $$2\pi f_o (t_{z1} - KT_- - S_1) - \frac{\Delta \phi}{2} = m\pi \qquad (61)$$

where $m$ is some integer. The solution of equation (61) gives $$t_{z1} = \frac{m\pi}{2\pi f_o} + \frac{\Delta \phi}{4\pi f_o} + KT_- + S_1 \qquad (62)$$

Similarly, the zero value and zero crossing of the signal $R_2(t)$ in its aperture for the $n^{th}$ operational cycle is given by $$t_{z2} = \frac{m\pi}{2\pi f_o} - \frac{\Delta \phi}{4\pi f_o} + KT_+ + S_2 \qquad (63)$$

The zero-crossing detectors in the ZX DET block 53 in FIG. 2 are designed to locate the adjacent zero crossings of $R_1(t)$ and $R_2(t)$ about the centers of their time apertures for each operation cycle. For adjacent zero crossings the integers m in equations (61) and (62) are identical. The output of the ZX DET block 53 is a periodic pulse train in which the pulse of each period begins at the central zero crossing of $R_2(t)$ in its aperture and ends at the central crossing of $R_1(t)$ also in its aperture. Therefore the durations of these pulses are specified by $$\Delta t_z = t_{z1} - t_{z2} = K(T_- - T_+) + \Delta S + \frac{\Delta \phi}{2\pi f_o} \qquad (64)$$

in which $\Delta S = S_1 - S_2$. From equations (31) through (39), equation (64) may be restated as $$\Delta t_z = K(\Delta t + \Delta \tau) + \Delta S + \frac{\Delta \phi}{2\pi f_o}, \qquad (65)$$

in which $\Delta t$ is the desired quantity defined in equation (7), $\Delta \tau$ is the residual time delay error of the T/R switches 16 and 19 and the preamplifiers 49 and 57 as defined in equation (35), and $\Delta \phi$ is an adjustable phase shift 67.

By setting the adjustable phase shift so that $$\frac{\Delta \phi}{2\pi f_o} = -(K\Delta \tau + \Delta S), \qquad (66)$$

perfect error compensation is achieved and $$\Delta t_z = K\Delta t \qquad (67)$$

which shows that the basic objective has been accomplished in that the burst length factor K has been established as the magnification factor for $\Delta t$. Proper adjustment of the adjustable phase shifter 67 can be accomplished easily under the condition of zero flow. For zero flow $\Delta t = 0$ and the proper setting of $\Delta \phi$ to achieve equation (66) will be reached when $\Delta t_z = 0$.

Although perfect error compensation can be achieved as described above, minimum error sensitivity requires making $\Delta \tau$ as small as possible by design. From equation (66) it is clear that the error $\Delta \tau$ is not suppressed in the signalling scheme since it is also multiplied by the factor K. But the delay error $\Delta S$ of the LPFs 52 and 59 and the delay errors of the zero-crossing detectors 53 are suppressed since they are not multiplied by the factor K. Hence minimum sensitivity to errors and best implementation of the signalling technique described will result when $\Delta \tau$ is made by design as small as possible. In general, the part of $\Delta \tau$ from the T/R swithces 16 and 19 is fairly small compared to that part contributed by the amplifiers 49 and 57. The latter contribution can be kept as small as possible by designing amplifiers with maximum gain band width components and lowest acceptable gains. Techniques are available for successful modulation of signals at levels lower than $-40$ dbm ($0$ dbm $= 10^{-3}$ watts).

The pulse train output described overcomes the technical difficulties initially pointed out, as appears from the two implementations shown in FIGS. 4 and 5.

As an example of the workings of a practical arrangement pursuant to the invention, the graph in FIG. 3, which has a time abscissa, illustrates some of the more important occurences. This is a numerical example chosen arbitrarily for a pipe having an ultrasonic frequency transit time of approximately 200 microseconds and is based on a signal repeat time of 480 microseconds. A repeat interval of 480 microseconds duration occurs indefinitely while this apparatus is in operation. Both of the transmit-receive units 16 and 19 are initially energized at zero time and operate for a duration or time span of 160 microseconds (line $G(t)$) as an arbitrarily chosen period, a period less than the transit time in the path 11. Each pulse train or burst thus endures for one hundred sixty microseconds and includes a large number (K) of individual pulses. This is illustrated in FIG. 3 in line $e_{s1}(t)$; $e_{s2}(t)$ by sinuously shaded portions above and below the horizontal line showing that both of the units 16 and 19 are simultaneously transmitting in opposite directions at high frequency. This transmit or burst time, terminating at the end of 160 microseconds, is immediately followed by a non-transmit or silent time of 80 microseconds to afford a clear interval. At the end of the transmit time and of the interval; i.e. at the end of 240 microseconds from the zero or start time, both of the transmit-receive units 16 and 19 are conditioned simultaneously to receive. They receive the numerous high frequency pulses in the two signal bursts for a time period itself lasting 160 microseconds. Following the receive interval of 160 microseconds, there is again a gap or silent period of 80 microseconds, again to make sure that there is no intermix of the transmit and receive signals. The time then amounts to a total of 480 microseconds, whereupon the just-described cycle is repeated. In the next lower line of FIG. 3, $\bar{R}_1(t)$; $\bar{R}_2(t)$, the received signals are illustrated without reference to the transmit signals, so that the received signals stand out individually.

Preferably the burst signals are transmitted in the form of sine waves which, when received are heterodyned, the effect being to produce for each burst a single, resulting sine wave equal in time width to the total receive period. The relative time position of each received signal, or its phase, is, for one signal, a function of the addition of the velocity of the stream in the direction of the arrow 7, and for the other signal is a function of the subtraction of the velocity of the stream. The sine waves as received and heterodyned thus appear in different phase relationship in the two lines $R_1(t)$; $R_2(t)$ of FIG. 3.

It will be noted that the zero-crossing point of the first signal in one line ZX $DET_1$ is represented at one location in the time scale, whereas the zero-crossing point of the second signal is represented in the next lower line ZX $DET_2$ at a different location in the time scale.

As reflected in the next lower line ZX $DET_{out}$, the difference between the two zero-crossing times is shown or illustrated as a square wave, the horizontal time width or length of which, indicated as $\Delta t_z$, is a representation or measure of the velocity in the direction of the arrow 7 of the stream.

The foregoing is but a single numerical example and the values and times vary in individual installations, but the general relationship of the events in each case is substantially as set out.

More particularly to illustrate the details of construction of one form of flow meter producing the desired results, there is shown in FIG. 4 an arrangement in which many of the units are as previously described and in which more complete circuitry is disclosed. In this arrangement the closely controlled frequency generator or oscillator 41 furnishes a signal $f_s = MKf_o$ through a conductor 81 having a junction 82 therein to a frequency divider 83 for dropping the frequency ($\div M$) to a selected value, which feeds through a conductor 84 ($e_t$; $f_t = Kf_o$) into a lead 86 joined to and controlling the first transmit-receive unit 16 $Tr_1$ furnishing a signal $e_{s1}$. A branch 87 connects to and controls the second transmit-receive unit 19 $Tr_2$ furnishing a signal $e_{s2}$. The conductor 84 extends through another frequency divider 91 ($\div K$) and sends a signal $f_o$ through a conductor 92 leading into a phase comparator unit 93. This unit 93, an edge-controlled, multi-logic network (ECMN), is responsive to the edge of a square wave, and in this instance senses the comparable edges of square waves in two distinct trains and affords an output according to the phase difference between the two wave trains. The output of the unit 93 is carried through a conductor 94 and through a low-pass filter 96 for simplifying the signal, the wanted portion of which acts through a voltage controlled oscillator 97 feeding a junction 98 ($e_d$; $f_d = (K-1)f_o$). A conductor 99 carries part of the signal from the junction 98 through a frequency divider 101 ($\div K-1$) into a conductor 102 and thence into the other of the inputs to the phase comparator 93. A heterodyne reference signal, properly synchronized in frequency and phase, is thus made available at the junction 98.

From the conductor 84 at a junction 103 a conductor 104 carries the divided frequency signal from the oscillator 41 through a modulator 105. From the junction 98 the conductor 99 also extends through a lead to the modulator 105 and to a manually settable phase adjuster 106 ($\Delta\phi$). The modulated signal goes through a conductor 107 and a low-pass filter 108 to exclude unwanted signal. The remaining, desired signal goes then through a conductor 109 and through a signal-shaping amplifier 111 ($f_o$-reference) and finally through a conductor 112 into a logic unit 113. The arriving signal is, as illustrated, a square wave train 114 of frequency $f_o$. From the logic unit 113 there is a timing signal, illustrated by the curve 116, led through a conductor 117 ($G(t)$) to a junction 118. From there a lead 119 extends to the transmit-receive unit 16, and from a junction 120 a similar lead 121 extends to the transmit-receive unit 19.

The transmit-receive unit 16, when set to receive by the timing signal on the conductor 117 and the lead 119, is effective to supply the signal, received from the transducer 8 through the conductor 17, through a connector 122 and through a preamplifier 123 into a conductor 124 ($\bar{R}_1$) having a junction 126 and leading into a modulator 127 for heterodyning the sine wave signal with a cosine wave signal to produce a low frequency sine wave signal. The modulated signal is then carried through a conductor 128 and through a low-pass filter 129, leaving only the desired signal component $R_1$, and into a conductor 131 to a zero-crossing detector 132. In this fashion, one signal crossing the pipe in one direction is appropriately shaped and is led into the zero-crossing detector.

Similarly, when the transmit-receive unit 19 is similarly set to receive by the timing signal on the conductor 117 and the lead 121, it transfers its signal, received from the transducer 9 through the conductor 18, through a lead 133 into its own preamplifier 134 and from there through a conductor 136 ($\bar{R}_2$) in which a junction 137 is disposed. The high frequency sine wave signal goes into a modulator 138 for heterodyning with a cosine wave signal into a low frequency sine wave signal under control of the phase adjuster 106, which acts as previously described and from which leads 139 and 140 go to modulators 127 and 138 respectively. The output of the modulator 138 leads through a conductor 141 into a low-pass filter 142 having an output lead 143 for transmitting the desired signal $R_2$ to the zero-crossing detector 132.

The oscillator 41 is effective through the junction 82 to supply a conductor 146 leading through several stages of charge amplification to control the ultimate output. For example, the conductor 146 acts through a positive charge ($+\Delta Q$) unit 147 to supply charge at a terminal 148 connected to one side of a capacitor 149 through a lead 151. The terminal 148 is connected also through an amplifier 152 to a junction 153 having a lead 154 connected to the other side of the capacitor 149.

The junction 153 connects to a voltage-controlled oscillator 156 also joined to a junction 157 from which a lead 158 goes to an and-gate 159. A negative charge ($-\Delta Q$) unit 161 is joined to the gate 158 and through a conductor 162 to the junction 148. This constitutes one stage of a charge amplifier and at the junction 157 gives a signal of frequency $f' = (3MK/t_\pm)$. Comparably, to the junction 157 is joined a positive charge (+ΔQ) unit 163 leading to a junction 164 having a connection 166 to one side of a capacitor 167, the other side of which goes through a lead 168 to a junction 169. Between the junctions 164 and 169 in parallel with the capacitor 167 is an amplifier 171. To the junction 169 is connected a voltage-controlled oscillator 172 joined to a conductor 173 having a junction 174 from which a lead 176 goes to an and-gate 177 and from there through a connection 178 to a negative charge (−ΔQ) unit 179 joined through a lead 181 to the junction 164. From this second stage charge amplifier there is a signal of frequency $f'' = (3MKT_p/t_\pm^2)$ furnished to a third stage.

The conductor 173 goes to an and-gate 182 controlled through a lead 183 from the output of the zero-crossing detector 132. To the gate 182 is joined a positive charge (+ΔQ) unit 184 going to a junction 186 leading through an amplifier 187 to a junction 188. From the junction 186 a lead 189 goes to one side of a capacitor 191, the other side of which is connected by a conductor 192 to the junction 188. A lead 193 goes from the junction 188 to a voltage-controlled oscillator 194 while a lead 196 goes to a junction 197. A lead 198 connects the junction 197 to a gate 199 joined by a conductor 201 to a negative charge (−ΔQ) unit 202, in turn joined by a lead 203 to the junction 186. From the junction 197 the lead 196 continues to a suitable meter 204 or appropriate indicator of the output signal frequency, expressed as $$F_o = \frac{3MK^2 \Delta t}{t_\pm^2} = \frac{6MK^2 v}{l}.$$

The various gates 159, 177 and 199 are specially controlled, as will appear. The gate 199 is responsive through a conductor 206 to a flip-flop 207 actuated from the logic unit 113. The incoming signal 114 produces a timed square wave signal form 208 carried by a conductor 209 through a junction 211 to the zero-crossing detector 132 to control the output thereof, and through a conductor 219 to the flip-flop 207.

The gates 159 and 177 are specially controlled. For that reason, a signal form 223 derived in the logic unit 113 from the incoming signal 114 is furnished through a conductor 224 to an edge detector 226 optionally supplied with incoming signals ($\bar{R}_1$) from the junction 126 or from the junction 137 ($\bar{R}_2$) through a switching conductor 227. The output from the edge detector travels through a lead 228 and is divided to supply a set signal to a flip-flop 229 and a reset signal to a flip-flop 231. The flip-flop 229 receives a reset timing signal 116 from the conductor 117 which also goes to the T/R units 16 and 19 through a connection 232. The flip-flop 231 similarly receives a set signal 233 from the logic board 113 through a lead 234. The flip-flop 229 through a line 236 sends a signal, if available, to the flip-flop 207, while the flip-flop 231 through branches 237 and 238 of a lead 239 sends signals $(T_\pm - \Delta) = t_\pm$ to the and-gates 159 and 177.

From the functional aspect, the independent generator 41 is used to establish the frequency $f_s = MKf_o$, where M is some integer and $f_o$ is chosen according to equation (44). This frequency is divided by the factor M to yield $f_t = (f_s/M) = Kf_o$, the frequency of the sinusoidal waves within the transmitted bursts. The frequency $f_t$ is applied to the T/R units 16 and 19. Also, the frequency $f_t$ is divided by the factor K to yield the reference frequency $f_o$ for the phase-locked loop (92 to 102) to provide the demodulation frequency $f_d = (K-1)f_o$. This ensures synchronization of $e_d(t)$ in frequency and phase with the signals $e_t(t)$. Proper selection of phase reference for the generation of timing signals in the circuits in the logic unit 113 is obtained by feeding the signals $e_t(t)$ and $e_d(t)$ to the modulator and extracting the difference frequency produced by the low-pass filter. This provides the correct phase reference signal 114 for deriving the timing signals and elsewhere in the device.

An edge detector 226 is used with the elements described heretofore which produce a periodic pulse train of repetition period $T_p = 3t_o$ and pulse duration $\Delta t_z = K\Delta t$. The edge detector may be connected either to the $\bar{R}_1(t)$ signal at junction 126 or to the $\bar{R}_2(t)$ signal at the junction 137, to determine its time of arrival within each operation cycle. From equations (45) or (46) the arrival time relative to the beginning of each operation cycle is $T_-$ or $T_+$, depending upon the connection chosen. Thus, the output of the edge detector is a logic transition at a time $T_\pm$ relative to the beginning of each operation cycle. This output resets the flip-flop 231 previously set each operating cycle by a delayed timing pulse from the logic unit 113 through the conductor 234. The timing pulse delay 200 relative to the beginning of each operation cycle is an adjustable quantity Δ; thus the duration of the output of the flip-flop 231 for each operation cycle is $(T_\pm - \Delta)$. By proper adjustment of the delay Δ, the duration can be made equal to $\tau_+$ or $\tau_-$ as defined in equations (34) or (33); then the duration of the flip-flop 231 output becomes $$(T_\pm - \Delta) = t_\pm \qquad (68)$$

as required for correct compensation for sound velocity.

The output of the edge detector 226 is also used to set the flip-flop 229, which is reset by a timing signal from the logic unit 113 through the conductors 117 and 232 at the beginning of each operation cycle. A failure of the flip-flop 229 to set is an indication that the expected "receive" signal has failed to arrive. This implements a fault signal to maintain the correct output pulse rate despite fades or other interruptions.

The output pulse train from the zero-crossing detector 132 in the conductor 183 and transit time $t_\pm$ indicated by the durations of the flip-flop 231 are combined into a pulse frequency $F_o$ directly proportional to the flow velocity. As above described, $$F_o = \frac{6MK^2 v}{l} \qquad (69)$$

in which M is chosen to satisfy scaling and accuracy requirements. The factor K determines both the length of each burst and the magnification factor Δt, itself chosen to minimize errors due to finite speed of electronic devices and the desired flow range for the pipe.

There is another version of the circuitry set forth in FIG. 4 which does not depend on an accurate crystal oscillator such as 41 for its operation. As particularly disclosed in FIG. 5, there is a modified circuit in many parts similar to that in FIG. 4. Some of the same reference numerals are used for comparable parts, and the description given hereinabove with respect to those parts applies in connection with FIG. 5 also. In the FIG. 5 version there is a voltage-controlled oscillator 246 connected through a lead 247 to a junction 248. A conductor 249 extends from the junction to a frequency divider ($\div M$) 251, from which extends a conductor 252 ($e_t; f_t = Kf_o$) having one branch 253 extending to the transmit-receive unit 16 and another branch 254 extending to the transmit-receive unit 19. The units 16 and 19 are connected to the transmitting and receiving devices 8 and 9 through conductors 17 and 21, as previously described.

The conductor 252 extends to the frequency divider 91 ($\div K$) connected by the conductor 92 ($f_o$) to the ECMN - phase comparator 93, in turn joined by the conductor 94 to the low-pass filter 96 and connected to the voltage-controlled oscillator 97 supplying its output to the terminal 98 ($e_d; f_d(K-1)f_o$). A conductor 99 extends in one direction from the terminal 98 to the frequency divider 101 connected through the conductor 102 to the second input to the ECMN - phase comparator 93.

Branching from the conductor 252 at a junction 256 is the conductor 104 extending to the modulator 105 within which heterodyning occurs. The modulated signal is carried through the lead 107 and the low-pass filter 108 and the lead 109 to the pulse-shaping amplifier 111, the output of which ($f_o$; Ref.) is carried by the conductor 112 to the logic unit 113. Within the unit 113 are various logic circuits supplied from the conductor 112 and furnishing signals. The supplied reference signal is as represented by the graph 114. Shaped within the logic unit 113 is a signal ($G_t$), represented by the graph 116, carried by the conductor 117 to the junction 118 having the connection 119 to the transmit-receive unit 16. The conductor 117 also extends to the junction 120 having the connection 121 to the transmit-receive unit 19. The transmit-receive unit 16 has its output carried by the conductor 122 into the preamplifier 123 and from there the signal ($\bar{R}_1$) goes through the conductor 124 to the junction 126, from which the conductor 124 also extends to the modulator 127. The output of the modulator goes through the conductor 128 to the low-pass filter 129. The conductor 131 carries the filter output ($R_1$) to one of the inputs of the zero-crossing detector 132.

Similarly, the transmit-receive unit 19 has the conductor 133 connected to its own preamplifier 134 itself having the signal ($\bar{R}_2$) going through the conductor 136 extending to the junction 137 and to the modulator 138. The conductor 99 supplies the phase adjuster 106 for the two modulators 127 and 138. The conductor 141 connects the modulator 138 to the low-pass filter 142. The output ($R_2$) of the low-pass filter 142 goes through the conductor 143 to another input of the zero-crossing detector 132.

From the junction 126 a conductor 257 extends to a signal detector 258 supplied from the T/R unit 16 and likewise supplied through a conductor 259 with the signal of the T/R unit 19 from the junction 137. The signal detector output is carried by a conductor 261 to a low-pass filter 262. A connection 263 joins the low-pass filter to a pulse-shaping amplifier 264. From that amplifier a conductor 266 ($T_c$) extends to a junction 267. From the junction 267 the conductor 266 extends to one side of a phase comparator 268. The logic unit 113 generates a base signal 313 supplied through a conductor 314 to the comparator 268 for phase comparison therein with the signal from the conductor 266. The output of the comparator is carried by a lead 269 extending through a low-pass filter 271 and a lead 272 to the voltage-controlled oscillator 246, thus completing that control circuit.

From the junction 267 there is another conductor 273 extending to the set terminal of a flip-flop 274 also supplied at the reset terminal with the signal 116 by a lead 276 from the junction 120. The output of the flip-flop 274 is carried by a conductor 277 to a flip-flop 278. There is another input to the flip-flop 278 through a conductor 279 extending to a junction 281. Within the logic unit 113 there is generated and supplied to a conductor 282 an enabling signal supplied to the junction 281 and having the configuration represented by the graph 283 in FIG. 5. From the junction 281 the signal 283 is supplied through the conductor 279 to the flip-flop 278 and from the junction 281 flows through a lead 284 going to the zero-crossing detector 132. The output of the detector 132 ($\Delta t_z = K\Delta t$) is carried by a conductor 286 to control an and-gate 287 also receiving an input through a conductor 288 from the junction 248.

The and-gate 287 is joined by a connector 289 to a positive charge ($+\Delta Q$) unit 291 of a charge amplifier having a junction 292 joined to the unit 291 by a lead 293. The junction 292 connects to one side of a capacitor 294 through a conductor 296. The other side of the capacitor 294 is joined by a lead 297 to a conductor 298 extending between an amplifier 299 and a voltage-controlled oscillator 301. The input side of the amplifier is joined to the junction 292 by a lead 302. The voltage-controlled oscillator 301 is connected to a conductor 303 having a junction 304 therein joined by a lead 306 to an input of an and-gate 307 also supplied from the flip-flop 278 through a lead 308. The gate 307 is connected by a lead 309 to a minus delta Q ($-\Delta Q$) unit 311 having a lead 312 extended to the junction 292. In addition, the logic unit 113 has a delay adjustment ($\Delta$) represented by the graph 316. Finally, the junction 304 has a conductor 317 from which the output of the described circuitry is carried to an indicator 318 for showing the velocity of the stream in the pipe 6.

$$F_o = \frac{3MK^2\Delta t}{4t_\pm} = \frac{3MK^2v}{2l}$$

From the functional aspect, much of the operation of the FIG. 5 circuitry is the same as that of FIG. 4. The main difference is the replacement of the independent generator 41 by a voltage-controlled oscillator 246. This oscillator and the exclusive-or phase comparator 268 controlling it form part of an over-all, phase-locked loop for establishing a definite relationship between the frequency $f_s = MKf_o$ with the transit time $t_+$ or $t_-$.

One input to the phase comparator 268 is a delayed timing wave form from the logic unit 113, wherein the delay is an adjustable quantity $\Delta$. The other input to the phase comparator 268 is an aperture signal derived from a modulator or signal detector 258 to which the inputs are the received signals $\bar{R}_1(t)$ and $\bar{R}_2(t)$. From equations (45) and (46) the output of the modulator 258 is an aperture signal proportional to $$\sum_{n=0}^{\alpha} G_o(t - nT_p - T_-)G_o(t - nT_p - T_+)\cos(2\pi f_s K\Delta\tau). \quad (70)$$

Since $\Delta\tau$ is very small, the factor $\cos(2\pi f_o K\Delta\tau)$ is, for present purposes, a non-zero constant, and therefore the aperture signal in equation (70) is characterized mainly by the functions $G_o(\,\cdot\,)$. From the definition of this function it follows that the aperture signal applied to the second input of the phase comparator 268 is an aperture wave form which begins at $T_-$ and ends at $T_+ + t_o$ relative to the beginning of each operating cycle. The center of this aperture relative to each cycle is therefore given by $$T_c = \frac{(T_+ + T_- + t_o)}{2}. \tag{71}$$

Since $T_+ \doteq T_-$ for all flow conditions, $$T_c \doteq T_\pm + \frac{t_o}{2} \tag{72}$$

The action of the phase-locked loop causes the center of the aperture signal given in equation (72) to coincide with the central transition edge of the delayed timing wave 316 from the logic unit 113. Relative to the beginning of each operation cycle, this transition edge is located at
$$2t_o + \Delta \tag{73}$$
Equating $T_c$ in equation (72) to the quantity in equation (73) yields $$\frac{3t_o}{2} = T_\pm - \Delta \tag{74}$$

By correct adjustment of the delay $\Delta$, the relationship of equation (74) becomes $$\frac{3t_o}{2} = t_\pm. \tag{75}$$

Since $f_s = MKf_o = (MK/t_o)$, it follows that, by the action of the phase-locked loop, there results the relationship $$f_s = \frac{3MK}{2t_\pm}. \tag{76}$$

Because $f_s$ as given in equation (76) has a specific relationship to the transit times through the flow medium, the chain of charge amplifiers 147 and 163 and voltage-controlled oscillators 156 and 172 of FIG. 4 is no longer necessary. This simplification permits the use of the simpler combining circuit of FIG. 5. The pulse frequency output $F_o$, as shown in FIG. 5, is given by $$F_o = \frac{3MK^2 v}{2l} \tag{77}$$

As a variation, in FIG. 5, an edge detector (see 226, FIG. 4) can also be used to derive an estimate of $T_+$ or $T_-$ for locking the frequency $f_s$ to a specific relationship with transit time $t_+$ or $t_-$. However, the use of a modulator 258 for this purpose, as shown in FIG. 5, has the desirable property of being more nearly immune to noise and other types of interruptions.

In both versions there is attained an improved immunity to noise and comparable interruptions, and a magnification of the quantity $\Delta t$ by a burst length factor K. This is important because $\Delta t$ is so small in usual practice.

What is claimed is:

1. An ultrasonic flow meter for measuring the velocity of fluid flow axially in a pipe comprising:
   a pair of transducers adapted to be disposed on said pipe to provide between them an energy path having a component axially of said pipe and a component transversely of said pipe,
   means for simultaneously sending a pair of similar signals from said transducers in opposite directions along said path,
   means for receiving said signals at said transducers,
   means for providing a signal corresponding to the transit time $t$, of one of said signals along said path,
   means for determining the difference in transit times, $\Delta t$, between said oppositely directed signals,
   means for providing a signal corresponding to the square of said transit time $t^2$,
   means for providing a quotient signal proportional to $\Delta t$, divided by $t^2$, said quotient signal being substantially proportional to the velocity, V, of fluid flow such that $\Delta t/t^2 \alpha\ v/l$, where $l$ is the length of said path.

2. An ultrasonic flow meter as recited in claim 1 wherein said means for providing a signal corresponding to $t$ and $t^2$ and said means for determining the difference in transit times $\Delta t$ are electronic and said signals of said pair are at supersonic frequency.

3. An ultrasonic flow meter as in claim 2 including means for sending each signal of said pair in the form of a burst made up of a predetermined number of cycles of an alternating energy wave.

4. An ultrasonic flow meter as in claim 3 including means for sending a succession of said pairs of simultaneous bursts at regular intervals.

5. An ultrasonic flow meter as in claim 2 wherein each signal of said pair of signals is in the form of a burst having a phase shift related to the transit time of said signal along said path.

6. An ultrasonic flow meter as in claim 5 wherein said means for determining the difference in transit time, $\Delta t$, comprises means for establishing a signal representative of the difference between the phase shifts of said signals of said pair as received.

7. An ultrasonic flow meter as in claim 6 including means for variably changing said phase difference.

8. An ultrasonic flow meter as in claim 6 wherein said means for determining the difference in transit times $\Delta t$ comprises means for heterodyning said received signals with a modulating signal for producing a single cycle sinusoidal waveform for each received burst.

9. An ultrasonic flow meter as in claim 5 including means for establishing the duration of each of said bursts as a predetermined fraction of the average transit time of each of said signals from end to end of said path.

10. An ultrasonic flow meter as in claim 9 in which said predetermined fraction is two-thirds.

11. An ultrasonic flow meter as in claim 1 wherein said signal corresponding to the transit time, $t$, has a frequency inversely proportional to the transit time $t$, and said signal corresponding to $t^2$ has a frequency inversely proportional to $t^2$.

12. A flow meter comprising a pair of transducers spaced apart along a flow path, an oscillator generating pulses at a set ultrasonic frequency, means forming a predetermined number of said pulses into bursts, means for simultaneously sending said bursts to said transducers at spaced timed intervals for transmission therebetween, means for reducing said number of pulses in each of said bursts received by said transducers to a single cycle sinusoidal waveform corresponding to each received burst, means for detecting the zero-crossing times of said single cycle sinusoidal waveforms resulting from said received bursts, means for establishing the zero-crossing time of one of said sinusoidal waveforms corresponding to one of said transducers as the leading edge of a square wave signal, means for establishing the zero-crossing time of the other of said sinusoidal waveforms corresponding to the other of said transducers as the trailing edge of said square wave signal, and means for representing the time dimension of said square wave as the velocity of flow in said path.

13. A flow meter as in claim 12 in which each of said intervals is longer than the transmission time of said bursts between said transducers.

14. A flow meter as in claim 12 including means for shifting the time position of one of said edges of said square wave signal.

15. A flow meter as in claim 12 in which said oscillator generates said pulses in sine wave form.

16. A flow meter as in claim 12 in which said means for reducing includes means for providing a signal in cosine wave form.

17. A flow meter as in claim 12 in which said representing means includes means for detecting said leading edge and said trailing edge of said square wave signal.

18. A flow meter as recited in claim 12 wherein said means for reducing comprises means for heterodyning a modulating signal with said received bursts.

19. A flow meter as recited in claim 18 wherein said received bursts signals are sine waveforms and said modulating signal is a cosine waveform.

20. A method of measuring the velocity of fluid flow in a pipe independently of the velocity of sonic energy in the measured medium comprising the steps of:

transmitting oppositely directed ultrasonic energy burst signals having non-zero axial components along a path through said pipe, receiving said transmitted oppositely directed burst signals, providing a signal corresponding to the transmit time $t$ of one of said received signals, measuring the difference signal, $\Delta t$, between said received signals by mixing a modulating signal with each of said received burst signals to provide a single cycle sinusoidal waveform, providing a signal corresponding to the time difference $\Delta t$ between said received signals by determining the zero-crossing of each of said single cycle sinusoidal waveforms, and forming a product signal $\Delta t$ divided by $t^2$ approximately proportional to $v$, where $v$ is the component of fluid velocity along said path.

21. A method of determining fluid flow velocity in a pipe comprising the steps of:

generating sonic energy burst signals of a predetermined number of pulses, simultaneously transmitting a pair of said sonic energy burst signals along oppositely directed paths through said pipe, receiving said burst signals in axially spaced receiving means, mixing a modulating signal with each of said received burst signals to provide single cycle sinusoidal waveforms for each received burst signal, detecting the zero-crossing times of each of said sinusoidal waveforms, utilizing said zero-crossing times to provide a difference signal corresponding to the difference in transit times, $\Delta t$, for said burst signals, and calculating and indicating said flow velocity by utilizing said difference signal.

22. A method of determining fluid flow as recited in claim 21 further comprising the step of providing a signal, $t$, corresponding to the transit time of one of said pair of burst signals, and said calculating step comprises the step of calculating the quotient signal $\Delta t/t^2$.

* * * * *

UNITED STATES PATENT OFFICE
CERTIFICATE OF CORRECTION

PATENT NO. : 3,935,735
DATED : February 3, 1976
INVENTOR(S) : Bock W. Lee

It is certified that error appears in the above-identified patent and that said Letters Patent are hereby corrected as shown below:

Column 6, between lines 5 and 15, should read:

where $$t_+ = \frac{\ell}{(c+v)} \qquad (3)$$

and $$t_- = \frac{\ell}{(c-v)} \qquad (4)$$

Signed and Sealed this ninth Day of August 1977

[SEAL]

Attest:

RUTH C. MASON
*Attesting Officer*

C. MARSHALL DANN
*Commissioner of Patents and Trademarks*